United States Patent
Wilby

(10) Patent No.: US 8,807,161 B2
(45) Date of Patent: Aug. 19, 2014

(54) DEVICE AND METHOD FOR DETECTING A FAILURE IN A POWERED VALVE

(75) Inventor: Richard Wilby, Pibrac (FR)

(73) Assignee: Airbus Operations SAS, Toulouse (FR)

( * ) Notice: Subject to any disclaimer, the term of this patent is extended or adjusted under 35 U.S.C. 154(b) by 759 days.

(21) Appl. No.: 12/668,607

(22) PCT Filed: Jul. 8, 2008
(Under 37 CFR 1.47)

(86) PCT No.: PCT/FR2008/051276
§ 371 (c)(1),
(2), (4) Date: Aug. 30, 2010

(87) PCT Pub. No.: WO2009/016299
PCT Pub. Date: Feb. 5, 2009

(65) Prior Publication Data
US 2011/0042593 A1    Feb. 24, 2011

(30) Foreign Application Priority Data
Jul. 12, 2007  (FR) ..................................... 07 05053

(51) Int. Cl.
*F16K 37/00*  (2006.01)
(52) U.S. Cl.
USPC .................. 137/554; 251/129.04; 251/129.11
(58) Field of Classification Search
USPC ............. 251/129.04, 129.11, 315.01, 129.01; 137/554
See application file for complete search history.

(56) References Cited

U.S. PATENT DOCUMENTS

| | | | | |
|---|---|---|---|---|
| 3,705,594 A | * | 12/1972 | Placek | 137/1 |
| 4,542,649 A | * | 9/1985 | Charbonneau et al. | 73/168 |
| 5,009,101 A | * | 4/1991 | Branam et al. | 73/168 |
| 5,152,308 A | | 10/1992 | Koch | |
| 5,178,361 A | * | 1/1993 | Gilbert et al. | 251/129.05 |
| 5,624,100 A | * | 4/1997 | Bolte et al. | 251/65 |
| 6,220,566 B1 | * | 4/2001 | Miller | 251/58 |
| 2005/0067600 A1 | | 3/2005 | Wilfert | |
| 2005/0247902 A1 | * | 11/2005 | Dreier et al. | 251/315.01 |

FOREIGN PATENT DOCUMENTS

| | | |
|---|---|---|
| DE | 4107860 A1 | 9/1992 |
| JP | 1-121733 | 5/1989 |
| JP | 7-194186 | 7/1995 |
| JP | 7-280705 | 10/1995 |
| WO | 2004027828 A3 | 4/2004 |

OTHER PUBLICATIONS

International Search Report and Written Opinion dated Apr. 16, 2009.
International Search Report and Written Opinion dated Feb. 16, 2010.

\* cited by examiner

*Primary Examiner* — John K Fristoe, Jr.
*Assistant Examiner* — Angelisa Hicks
(74) *Attorney, Agent, or Firm* — Dickinson Wright PLLC

(57) ABSTRACT

The disclosed embodiments relate to a fuel line valve for an aircraft, that includes a shell capable of rotation inside the valve body and connected to a driving shaft driven by an electric actuator. The valve further includes a torque generation means and position detection means. The torque generation means are connected to the shell and generate a torque that varies based on the position of said shell in the valve body on the driving shaft. The position detection means provide electric signals characterizing the positions of said driving shaft. The disclosed embodiments also relate to a method for diagnosing the operation of such a valve in order to detect a failure during the operation thereof, and to a device for implementing said method.

8 Claims, 4 Drawing Sheets

DEVICE AND METHOD FOR DETECTING A FAILURE IN A POWERED VALVE

CROSS-REFERENCE TO RELATED APPLICATIONS

This application is the National Stage of International Application No. PCT/FR2008/051276, filed on 8 Jul. 2008, which designated the United States of America, and which international application was published as Publication No. WO 2009/016299, which claims priority from French Patent Application, No. FR 07 05053, filed on 12 Jul. 2007, both of which are incorporated by reference in their entirety.

BACKGROUND

The aspects of the disclosed embodiments relate to a valve, the operation of which is provided by a remotely controlled actuator. More particularly, the disclosed embodiments relate to a device and to a method for detecting failures in the main constituent elements of a valve, such as a drive shaft or a motor of the valve, especially when the valve is used in an circuit which is important for safety reasons, such as an aircraft fuel circuit.

Aircraft fuel circuits generally include fuel valves for performing functions such as cutting off the feed to the engines, opening for refueling or transferring fuel between independent tanks.

As illustrated in FIG. 1, a fuel valve 1 comprises an actuator 11 driven by an electric motor 12 coupled to a reduction gear. The actuator 11 rotates a spherical ball 13 by means of a drive shaft 14 which penetrates into a fuel tank 15. The spherical ball 13 is inserted into a valve body 16 and is mounted so as to rotate as one around an axis 132 inside said valve body. The spherical ball 13 has a through-opening 133 of axis 134, approximately perpendicular to the axis 132. The valve body 16 has two approximately cylindrical ends 161, of diameter substantially smaller than the diameter of the spherical ball, to which ends fuel flow pipes 17 are fixed. The two ends 161 of axis 171 are substantially aligned, approximately perpendicular to the axis 132.

In such a fuel valve, there is no intermediate position in normal operation, the valve either being in an open position or in a closed position.

When the valve is in an open position, to allow fuel to flow, the axis 134 of the opening 133 of the spherical ball 13 and the axis 171 of the flow pipes 17 are substantially coaxial.

When the valve is in a closed position, to block the flow of fuel, the axis 134 of the opening 133 of the spherical ball 13 and the axis 171 of the flow pipes 17 are substantially perpendicular.

The current methods for monitoring such valves consist in comparing the controlled position of the valve and the detected position of the valve by means of switches positioned in the actuator 11. A fault in the monitoring devices is associated with the risk of one or more switches failing, for example due to electrical contact problems or to damage to the mechanism of the switch. In this case, the position of the valve cannot be determined and an error message, such as for example "unknown failure" is returned to a system for monitoring the aircraft. A maintenance operation is then necessary to close the valve in a known position and to replace the actuator 11, which may entail taking the aircraft out of service and may require relatively long times for detecting and executing the failure. Another limitation lies in the fact that only the position of the actuator 11 is monitored, and not the actual position of the spherical ball 13 or that of the drive shaft 14. This limitation leads to the possibility of hidden failures. Thus, it is possible for the position of the actuator 11 to be detected and sent to the flight deck although the spherical ball 13 is not in the corresponding position, for example following an undetected fault of the drive shaft 11. Such hidden failures, among them the failure of the drive shaft 11, are liable to affect the operational availability of an aircraft and it is necessary to program maintenance operations at regular intervals to check that the valves are operating correctly, which may prove to be penalizing for airlines.

One solution consists in adding position sensors on the spherical ball 13. However, the use of such sensors would involve introducing cables into the fuel tank, and this may lead to risks of short circuits.

Patent applications US 2003/193310 and US 2005/156550 and Japanese patents JP 7280705 and JP 1121733 and Japanese patent application JP 19930349329 describe various devices using dedicated microprocessors coupled to position sensors placed either actually inside the motor or on or adjacent to the drive shaft 14. Such solutions prove to be complex and have the drawback of increasing the number of sensors and in particular their associated power supplies close to the fuel tank.

SUMMARY

The aspects of the disclosed embodiments provide a valve and a method of diagnosing the operation of a valve during its operation in order to detect a failure on said valve.

An aircraft fuel circuit valve comprises a ball in a valve body that can be connected to fuel flow pipes, said ball being able to rotate about an axis in said valve body and secured to a first end of a drive shaft rotated by an electric actuator. The ball has a through-opening of axis approximately perpendicular to the axis of rotation and has two stable positions, at two ends of a range of rotation of said ball, such that:

in a first position of the ball, called the open position, the axis of the opening is oriented so as to allow the fuel to flow in the pipes;

in a second position of the ball, called the closed position, the axis of the opening is oriented so as to prevent the fuel from flowing in the pipes.

According to the disclosed embodiments, the valve comprises:

torque generation means positioned at one end of a secondary shaft secured to the ball, said torque generation means generating a torque, which can vary according to the position of the ball in the valve body, on the drive shaft and capable of increasing a current drawn by the actuator; and position detection means which are positioned at a second end of the drive shaft, opposite the first end, and capable of delivering signals characterizing positions of said drive shaft.

Advantageously, the torque generation means and the position detection means are positioned so that, when the ball passes from an open position to a closed position, the torque increases before the closed position is detected and when the ball passes from a closed position to an open position the torque increases before the open position is detected.

The torque generation means do not generate significant torque until closeness of the two ends of the rotation range is reached and generate a progressively increasing torque from close to each end up to the end in question.

In one embodiment of the disclosed embodiments, the torque generation means comprise:

a disk, secured to the secondary shaft on the side of the free end, having at least one protruding element; and two stop elements, positioned on the valve body, arranged so that the at least one protruding element is in contact with a stop element when the ball is substantially before the open position and the at least one protruding element is in contact with the second stop element when the ball is substantially before the closed position.

In another embodiment of the disclosed embodiments, the torque generation means comprise:

a disk, secured to the secondary shaft on the side of the free end, comprising at least one protruding element; and a stop element positioned on the valve body, which are arranged so that the at least one protruding element is in contact with a first flank of said stop element when the ball is substantially before the open position and the at least one protruding element is in contact with a second flank of said stop element when the ball is substantially before the closed position.

Advantageously, the position detection means generate at least one signal characteristic of the open position and at least one signal characteristic of the closed position.

In one embodiment of the disclosed embodiments, the position detection means comprise:

a cam, secured to the drive shaft on the side of the second end, having at least one protruding element; and at least one position detector sensitive to the position of the protruding element and arranged at each end of the rotation range, so that the at least one position detector changes state under the effect of the protruding element.

In another embodiment of the disclosed embodiments, the position detection means comprise at least two position detectors at each end of the rotation range, which are positioned so that when the ball passes from an open position to a closed position, the first position detector delivers the signal characteristic of the position of said drive shaft before the second position detector and when the ball passes from a closed position to an open position, the first position detector delivers the signal characteristic of the position of said drive shaft before the second position detector.

The disclosed embodiments also relate to a method of diagnosing the operation of a fuel circuit valve during operation, in which consistency of a control signal, sent to the actuator in order to make the ball pivot, with the signals generated by the torque generation means and the position detection means, is checked, or an inconsistency is detected.

The disclosed embodiments also relate to a device for implementing the method. Said device comprises:

control means, capable of controlling the rotation of the electric actuator and of recording the signals generated by the torque generation means and the position detection means;

power supply means, capable of delivering a necessary electric current to the actuator;

current control means, capable of measuring the intensity of the current and of analyzing the current drawn by the actuator; and maintenance means, capable of generating a warning message in the event of the valve failing.

BRIEF DESCRIPTION OF THE DRAWINGS

The disclosed embodiments will be described in detail with reference to the figures, which show.

DETAILED DESCRIPTION

Figure 1:
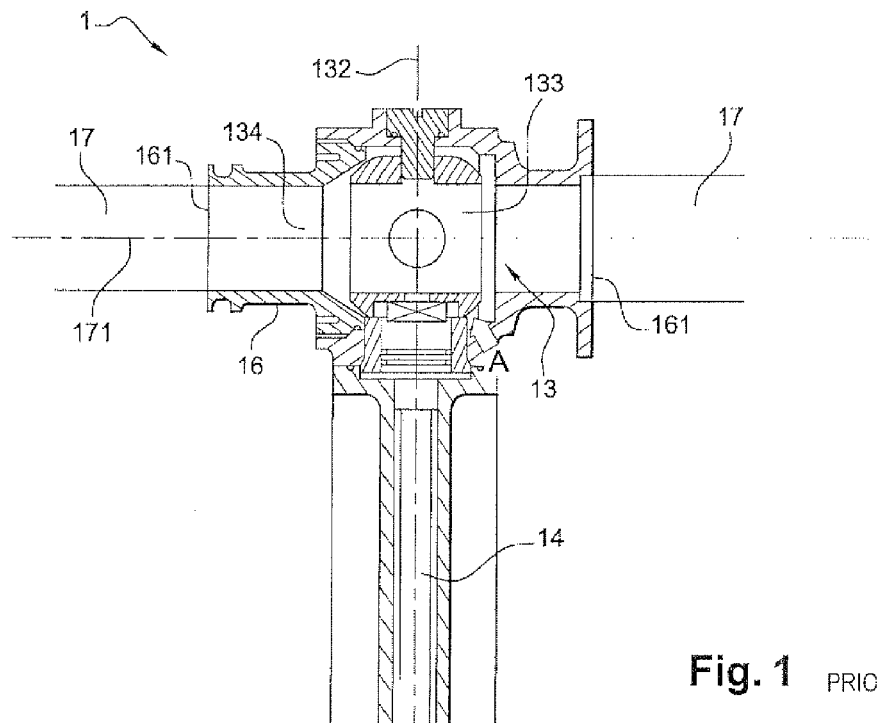
FIG. 1, already mentioned, a sectional view of a fuel valve according to the prior art.
Figure 1:
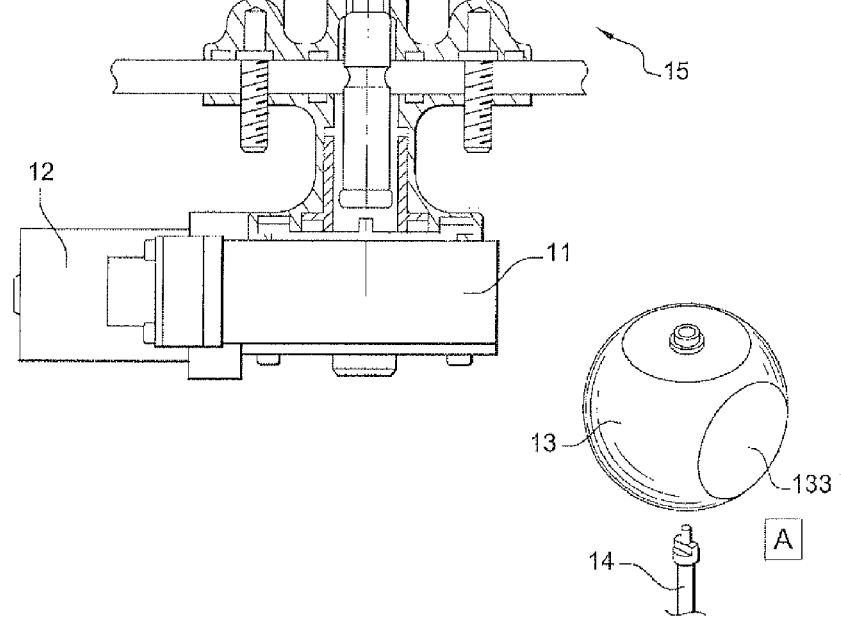
Figure 2:
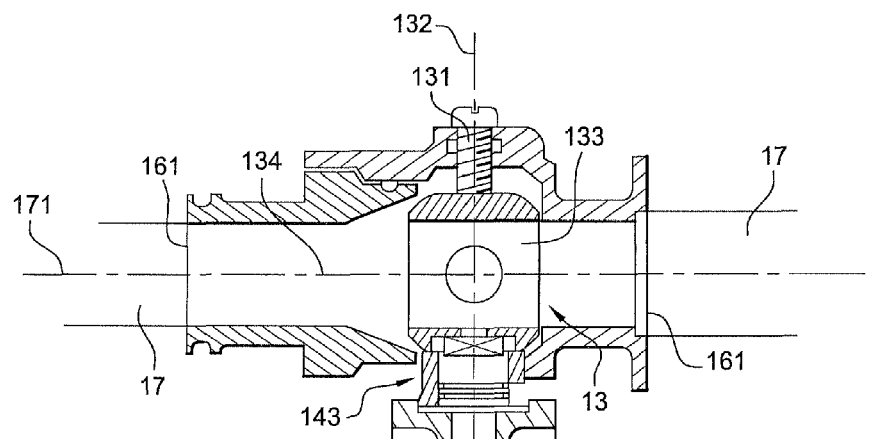
FIG. 2, a sectional view of a fuel valve according to the disclosed embodiments.
Figure 2:
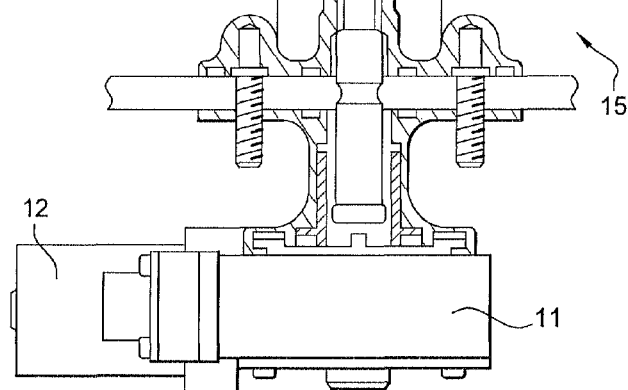

A fuel valve 1 of an aircraft fuel circuit according to the disclosed embodiments, as illustrated in FIG. 2, includes an actuator 11 driven by at least one electric motor 12 coupled to a reduction gear. The motor-driven actuator 11 rotates a drive shaft 14, which penetrates into a fuel tank via a damp-proof passage in one wall of the tank. The drive shaft 14, at a first end 143, drives a spherical ball 13.

The spherical ball 13 is secured to a secondary shaft 131 and is inserted into a fuel valve body 16 with the secondary shaft 131 protruding to the outside of said valve body. The spherical ball 13 and the secondary shaft 131 are mounted so as to rotate as one about an axis 132 inside the valve body 16.

The aspects of the disclosed embodiments will be described in the case of a spherical ball 13, although this choice is not limiting—in practice the ball may have any other shape provided that it has a surface of revolution about the axis 132, such as for example a cylindrical shape.

The valve body 16 has two approximately cylindrical open ends 161, of diameter substantially smaller than the diameter of the spherical ball 13, to which ends fuel flow pipes 17 are fixed. The two ends 161 of axis 171 are substantially aligned, approximately perpendicular to the axis 132.

The spherical ball 13 has a through-opening 133, of axis 134 approximately perpendicular to the axis 132. To allow or prevent fuel from flowing between the two flow pipes 17, the opening 133 in the spherical ball 13 is positioned relative to said flow pipes 17 by rotating the spherical ball 13 about the axis 132, between two stable positions:

a first position, called an open position, to allow fuel to flow, in which the axis 134 of the opening 133 of the spherical ball 13 and the axis 171 of the flow pipes 17 are substantially coaxial; and a second position, called the closed position, for blocking the flow of fuel, in which the axis 134 of the opening 133 of the spherical ball 13 and the axis 171 of the flow pipes 17 are substantially perpendicular.

Figure 3:
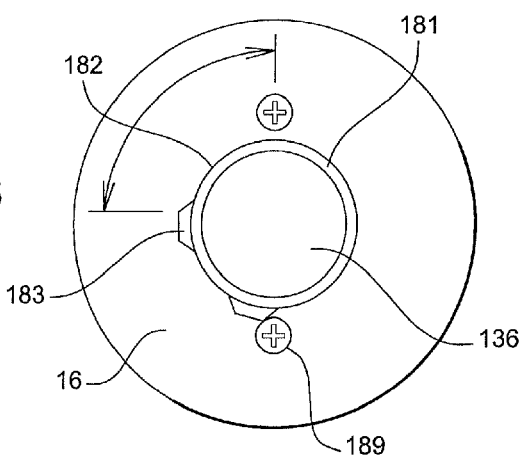
FIG. 3, a top view of torque generation means associated with the fuel valve.
Figure 4:
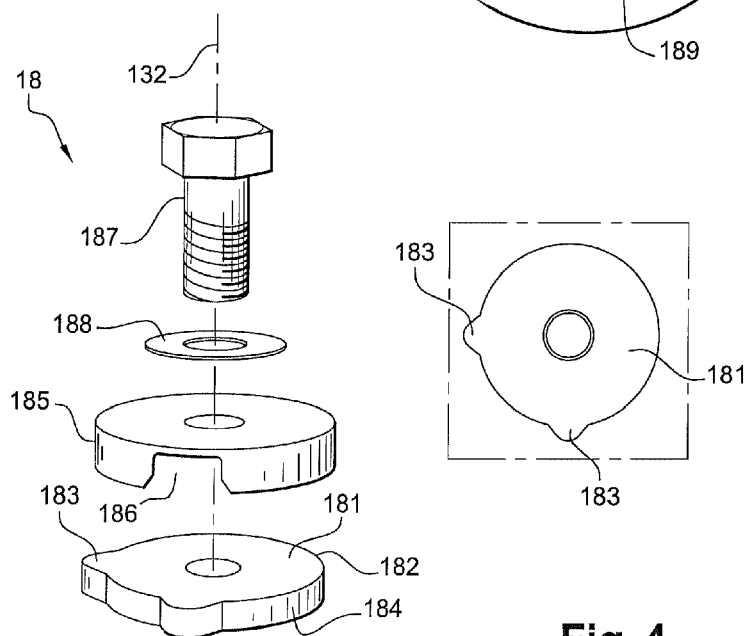
FIG. 4, an exploded view of the torque generation means associated with the fuel valve.
Figure 4:
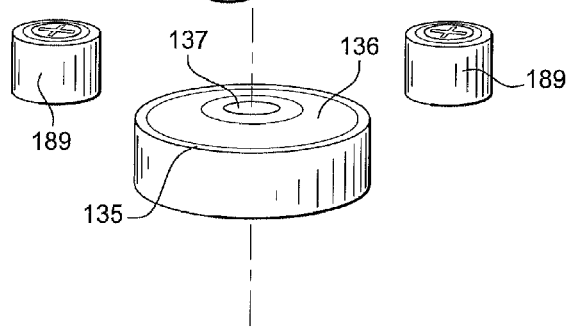

The fuel valve 1 further includes torque generation means 18, as illustrated in FIGS. 3 and 4.

The shaft 131 has, at one end 135 accessible from outside the valve body 16, a face 136 on which a disk 181 is mounted, the disk preferably having substantially the same diameter as the face of the shaft 131. Said disk includes at least one protruding element 183 on an outer peripheral surface 182.

Preferably, the at least one protruding element 183 is an excrescence on the disk 181 which together form one and the same part.

In one embodiment, the at least one protruding element 183 is formed by a frustoconical element secured to the outer peripheral surface of the disk via the large base.

Advantageously, the disk 181 is made of an elastomer material, said material having to be chosen from materials that are rigid and fuel-resistant.

Preferably, the disk 181 includes, over all or part of the outer peripheral surface 182, a foil, covering said outer peripheral surface so as to provide a wear-resistant surface. Preferably, the foil is made of a metallic material.

The disk 181 is kept secured to the secondary shaft 131 by means of a cover plate 185. To prevent any relative movement between said disk and said secondary shaft, the cover plate 185 includes blocking means 186, such as for example a blocking groove or an anti-rotation device.

The cover plate 185 and the disk 181 are fixed to the secondary shaft by means of a fixing element 187. In the example shown in FIG. 4, the fixing element is a bolt associated with a washer 188. Said bolt passes through the cover plate 185 and the disk 181, to engage in a thread 137 associated with said bolt, machined in the shaft 131.

Two stop means 189 are fixed to the valve body 16 by means of fixing elements, such as for example a screw.

The at least one protruding element 183 comes into contact, for a given angular position of the disk 181, with a first stop element 189 and comes into contact, for another given angular position of the disk 181, with a second stop element 189.

The two stop elements 189 are arranged in such a way that, when the spherical ball 13 is in the open position, the at least one protruding element 183 of the disk 181 is in contact with a first stop element 189 and when the spherical ball 13 is in the closed position, the second protruding element 183 is in contact with the second stop element 189.

In one embodiment, illustrated in FIGS. 3 and 4, in order to place the stop elements 189 in positions as far apart as possible relative to the axis 132, the disk 181 has two protruding elements angularly offset so as to obtain the same result.

Preferably, the stop elements 189 are made of a strong material such as a steel.

In one embodiment, the stop elements 189 are formed by cylinders, one of the bases of which is secured to the valve body 16.

The disk 181 is representative of the position of the spherical ball 13 to which it is secured to the drive shaft 14.

When the secondary shaft 131 secured to the spherical ball 13 is rotated in a certain direction, either to open or to close said spherical ball, by the at least one motor 12, the disk 181 is simultaneously rotated until the at least one protruding element 183 comes into contact with a stop element 189. This results in a resistance manifested by an increase in the torque on the drive shaft 14.

A rotation range of the spherical ball 13 is thus delimited at each of the ends by an increase in the torque, measurable from an increase in the current level drawn by the at least one motor 12.

Preferably, the value of increase in the torque is sufficient to create a clear and repeatable current inrush, but care is taken to limit the drive torque to a reasonable value so as not to introduce fatigue problems at the teeth of the actuator reduction gear.

Advantageously, the change in torque may be controlled by adjusting the level of deformation of the protruding elements 183 of the disk 181. This deformation adjustment is for example performed by modifying the diameter of the disk 181 or by modifying the spacing between the stop elements 189 and the secondary shaft 131 secured to the spherical ball 13.

In another embodiment (not shown), a single stop element 189 is fixed to the valve body 16 and at least one protruding element 183 comes into contact with a first flank of the stop element 189 for a given angular position of the disk 181 and with a second flank of the stop element 189 for another given angular position of the disk 181.

Figure 5:
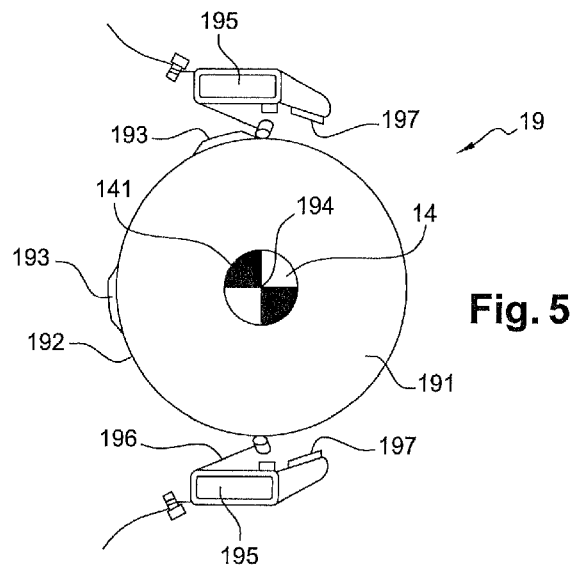
FIG. 5, a view of the position detection means associated with the fuel valve.

The fuel valve 1 also includes position detection means 19 placed inside the actuator 11, as shown in FIG. 5. Said position detection means comprise a cam 191 secured to the drive shaft 14 at a second end 141 located on the side of the actuator 11, and therefore outside the fuel tank.

The cam 191 has, on an outer peripheral surface 192, at least one protruding element 193 which actuates, for a given angular position of the cam 191, an angular position detector 195 and which actuates for another given angular position of the cam 191 another angular position detector 195.

The two position detectors 195 and the cam 191 are arranged in such a way that one of the position detectors 195 is actuated when the spherical ball 13 is in the open position and the other position detector 195 is actuated when the spherical ball 13 is in the closed position.

In one embodiment, illustrated in FIG. 5, in order to place the position detectors 195 in positions as far apart as possible relative to the axis 132, the cam 191 has two angularly offset protruding elements so as to obtain the same result.

Preferably, the protruding elements 193 are excrescences on the cam 191, forming one and the same part.

In one embodiment, the protruding elements 193 are formed by frustoconical elements, which are secured to the outer peripheral surface 192 of the cam 191 via the large base.

In one embodiment, the position detectors 195 are contact sensors, such as for example switches, a control lever 196 of which comes into contact with one of the two protruding elements 193 of the cam 191.

In another embodiment, the position detectors 195 are contactless sensors, such as for example Hall effect sensors.

The position detectors 195 make it possible to indicate the position of the actuator 11 of the carburetor valve 1.

Advantageously, the position detection means 19 include second position detectors 197 located close to each position detector 195.

The role of the second position detectors 197 is twofold. Firstly, when the position detectors 195 are defective, said second position detectors act as an additional means for returning a signal characteristic of the position of the actuator 11. Secondly, when the drive shaft 14 is defective, the second position detectors 197 are used as a means of signaling that the actuator has exceeded the rotation range.

In another embodiment, the second position detectors 197 are contactless sensors such as, for example, Hall effect sensors. Because they are contactless, the second position detectors 197 are more reliable.

Figure 6:
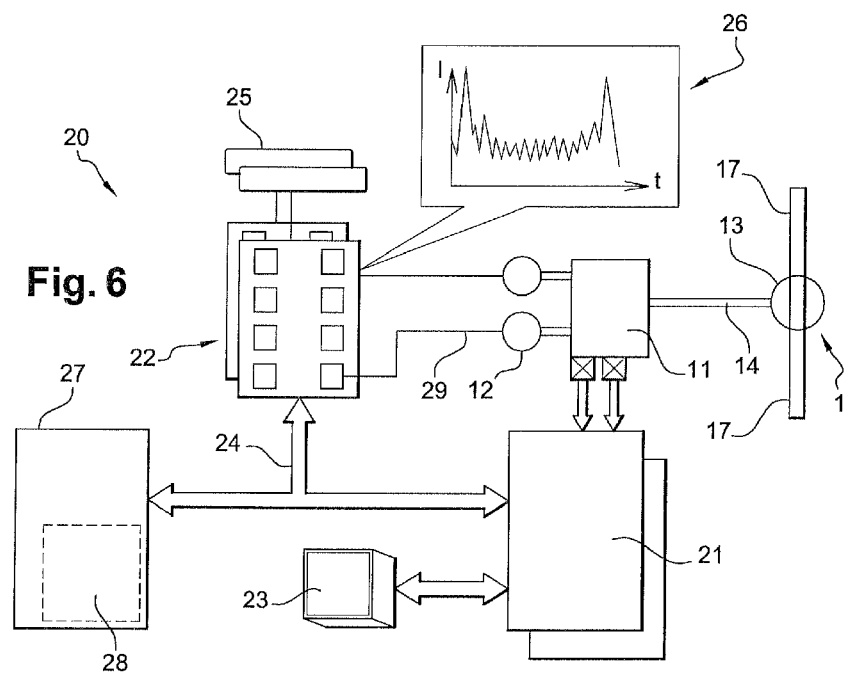
FIG. 6, a schematic illustrating a failure detection device which includes the fuel valve according to the disclosed embodiments.

Advantageously, the fuel valve is integrated into a failure detection device 20, illustrated schematically in FIG. 6. Said device includes control means 21 capable of controlling the at least one motor by power supply means 22.

The rotational movement of the spherical ball 13 is initiated in response to a command generated by the control means 21, as a function of signals received from other systems (not shown) and/or by means of a control member that can be actuated by the crew, such as for example a switch 23 positioned in the aircraft flight deck.

When a command is generated, the control means 21 transmit a signal to the power supply means 22 via a data bus 24, and said power supply means deliver, from an electrical distribution network 25, a supply electric current to the at least one motor 12 via supply cables 29.

By activating the at least one motor 12, the actuator 11 is rotated through approximately one quarter of a turn in the controlled direction of the drive shaft 14 which, in turn, drives the spherical ball 13, in order to switch from the open position to the closed position or vice versa.

The power supply means 22 further include current control means 26 which enable the intensity of the current to be measured and the current drawn by the at least one motor to be analyzed.

When a current inrush detected by the current control means 26 is interpreted as an increase in the torque generated by the torque generation means 18, a first signal, called a presignal for stopping the at least one motor, is generated.

Under normal operating conditions, when the control means 21 position the spherical ball 13 either in the open position or in the closed position, a current is delivered to the at least one motor 12 located near the actuator 11. Said actuator rotates the drive shaft 14 which, in turn, rotates the spherical ball 13 secured to the torque generation means 18. The spherical ball 13 pivots until the at least one protruding element 183 of the disk 181 comes into contact with a stop element 189. This contact incurs a resistance that opposes the rotation of the spherical ball and leads to an increase in the torque on the drive shaft 14, manifested by inrush current drawn by the at least one motor 12. When the current inrush is detected, the control means 21 generate the presignal for stopping the at least one motor. The at least one motor 12, which remains powered, still drives the drive shaft 14 until the at least one protruding element 193 of the cam 191 of the position detection means 19 actuates a position detector 195. A second signal, called the signal for cutting off the power to the at least one motor 12, is then sent to the control means 21 which cut off the supply to the at least one motor 12, this having the effect of stopping the drive shaft 14 and the spherical ball 13 from rotating either in the open position or in the closed position, depending on the command generated by the control means 21.

By analyzing the normal operation of the fuel valve 1, it follows that the signals relating to a current inrush, interpreted as an increase in the torque generated by the torque generation means 18, and relating to a state of the position detectors, which is generated by the position detection means 19, respond to a precise logic scheme described above.

The main failures of such a fuel valve 1 are the following:
a blockage of the spherical ball 13;
a rupture of the drive shaft 14; and
a malfunction of the actuator 11,
these having effects on said signals such that the logic scheme associated with correct operation of the fuel valve 1 is no longer respected.

Thus, any detected inconsistency, on the basis of the signals generated by the torque generation means 18 and the position detection means 19, is recorded by the control means 21 and a failure message is generated and then transmitted by the control means 21 to monitoring means 27 via the data bus 24.

In one embodiment, all the data necessary for the maintenance personnel to identify the failure, including for example which element is failing and the time available to make the repair, which mainly depend on the criticality of the fuel valve 1, are stored in a maintenance means 28.

Failure of the Position Detectors 195

The failure detection device according to the disclosed embodiments may for example detect a failure of the position detectors 195 by means of the second position detectors 197.

When the current inrush is detected, the first signal is triggered and the drive shaft 14 continues to rotate. If the position detectors 195 are defective and therefore do not transmit signals to the control means 21, the drive shaft 14 continues its rotation through an additional fraction of a degree until the at least one protruding element 193 of the cam 191 of the position detection means 19 is detected by the second position detectors 197. In this situation, said second position detectors replace said first position detectors and transmit a signal to the control means 21 which cut off the supply to the at least one motor 12. Said control means transmit a maintenance message, for example of the "defective switch" type to the maintenance means 28 so that operations to replace the defective position detectors 195 may take place. Knowing that the position detectors 195 have failed in this way does not mean that the aircraft has to be immediately taken out of service. The fuel valve 1 may thus remain in service since the spherical ball 13 rotates properly and the second position detectors 197 temporarily replace the position detectors 195.

Motor Failure

In another failure situation, when, as a result of a command issued by the control means 21, no current is drawn by the at least one motor 12, the supply to said at least one motor is interrupted. This failure is interpreted as a failure of the at least one motor 12 and a maintenance operation is programmed so as to replace the defective motor-driven actuator 11. The maintenance operation is programmed, to be carried out sooner or later depending on the criticality of the fuel valve.

Failure of the Bearings and/or the Reduction Gear

In another failure situation, when cyclic anomalies are detected by the current monitoring means 26, if said anomalies appear repeatedly at each rotation of the drive shaft 14, these anomalies are interpreted as the sign of incipient failures in the bearings and/or in the reduction gear, for example damage to a gear wheel of the reduction gear.

Failure in the Drive Shaft

In another failure situation, where no current inrush is detected and when the position detection means 19 transmit a power supply cut-off signal, the inconsistency is interpreted as an anomaly in the drive shaft 14.

The absence of feedback torque, manifested by the absence of current inrush in the current monitoring means 26, makes it possible to give the control means 21 an indication that the actuator 11 has pivoted as controlled by the control means 21, but that the spherical ball 13 has remained in its previous precontrolled position.

Since the spherical ball 13 does not rotate, the at least one protruding element 183 of the disk 181 of the torque generation means 18 is not engaged in the stop elements 189, and therefore no resistance to the movement is detected when the actuator 11 approaches the position controlled by the control means 21. When the feedback torque is absent, the power supply cut-off signal is not detected by the control means 21 and the drive shaft 14 continues to pivot until the at least one protruding element 193 of the cam 191 of the detection means 19 actuates with one of the two position detectors 195. Under these conditions, the actuation of the position detectors 195 is considered as a complementary first signal and the power supply to the at least one motor 12 is cut off as soon as the at least one protruding element 193 is detected by the second position detectors 197. A message is then sent by the control means 21 to the maintenance means 28 to prevent the loss of movement of the spherical ball 13 and to program an immediate maintenance operation. In this way, the crew is immediately aware of the nature of the failure and the clear rupture of the drive shaft 14 necessarily means that the valve has to be replaced before the next flight.

Valve Blockage

In another failure situation, when the control means 21 record a high current inrush but do not receive any indication about the position of the drive shaft 14 via the position detection means 19, an anomaly, such as the spherical ball 13 being jammed or iced up when ice is present in the fuel flow pipes 17, may be envisaged. Under such conditions, it is obvious that the at least one motor 12 applies a torque but the drive shaft 14 does not pivot. To discriminate between the failures and identify the presence of ice from other failure conditions, one means consists in including, in the control means 21, an algorithm capable of recording, in a non-volatile memory, the events detected as affecting the bearings or the reduction gear or other physical parts of the valve. Thus, if subsequently it is confirmed that there are no mechanical failures, the most probable cause of the valve blockage is the presence of ice in the flow pipes 17.

Among the methods for resolving the doubt regarding the presence of ice as the cause of valve blockage, attempts to make the spherical ball 13 undergo alternating movements are advantageously initiated. Said attempts confirm the presence of ice if said spherical ball remains inactive. Another solution consists in testing the valve when the temperature of the fuel reaches a temperature sufficient for water no longer to be in the ice state. If such actions are conclusive, the incident is reported in the memory of the maintenance means 28 and a message is sent so as to initiate a maintenance operation, such as that of checking that the water has been removed from the tank in question.

The invention claimed is:

1. An aircraft fuel circuit valve comprising:
   an actuator driven by an electric motor;
   a drive shaft configured for rotation by the actuator;
   a valve body configured for connection to a fuel flow pipe;
   a ball in said valve body, said ball having a through-opening and being secured to a first end of the drive shaft and configured for rotation by the motor-driven actuator, wherein the motor-driven actuator is configured to drive a second end of the drive shaft about an axis in said valve body, with the rotation having two ends in a range of rotation, in which one end of the range of rotation is defined as an open position, with the through-opening of the ball being oriented in a direction allowing fuel to flow through the fuel pipe, and the second end of the range of rotation is defined as a closed position, with the through-opening of the ball being oriented in a direction preventing the fuel from flowing through the fuel pipe;
   a torque generation unit that includes an elastomeric disk having at least one protruding element and stop unit, in which the torque generation unit is positioned at one end of a secondary shaft, which is distinct from the drive shaft, with the secondary shaft being secured to the ball, wherein said torque generation unit is configured to generate a torque, in which the torque is progressively generated as the ends of the range of rotation of the ball in the valve body are reached by simultaneous rotation of the disk and ball, until the at least one protruding element of the disk comes into contact with the stop unit, and the generation of the torque increases a current drawn by the actuator; and
   a position detector positioned at the second end of the drive shaft, opposite the first end of the drive shaft, with the position detector being structured to deliver signals characterizing positions of said drive shaft,
   wherein the torque is increased by deformation of the at least one protruding element of the elastomeric disk as the ball rotates from the open position to the closed position before the closed position is detected, and as the ball rotates from the closed position to the open position before the open position is detected, and the torque generation unit does not generate significant torque until closeness of the two ends of the rotation range is reached and generates a progressively increasing torque as the end of rotation is reached.

2. The valve as claimed in claim 1, wherein:
   the disk is secured to a free end of the secondary shaft,
   the stop unit is comprised of two stop elements, positioned on the valve body, and
   the disk and stop elements are arranged so that the at least one protruding element is in contact with a stop element when the ball is substantially before the open position and the at least one protruding element is in contact with the second stop element when the ball is substantially before the closed position.

3. The valve as claimed in claim 1, wherein:
   the disk is secured to a free end of the secondary shaft,
   the stop unit is comprised of two stop elements, positioned on the valve body, and
   the disk and stop elements are arranged so that the at least one protruding element is in contact with a first flank of said stop element when the ball is substantially before the open position and the at least one protruding element is in contact with a second flank of said stop element when the ball is substantially before the closed position.

4. The valve as claimed in claim 1, wherein the position detector is structured to generate at least one signal characteristic of the open position and at least one signal characteristic of the closed position.

5. The valve as claimed in claim 4, wherein the position detector comprises:
   a cam, secured to the drive shaft on the side of the second end, having at least one protruding element; and
   at least one detector element sensitive to the closeness of the protruding element and arranged at each end of the rotation range,
   wherein the at least one detector element is configured to change state under the effect of the protruding element.

6. The valve as claimed in claim 5, wherein the position detection unit comprises at least two position detector elements at each end of the rotation range, which are positioned so that when the ball passes from an open position to a closed position, the first detector element delivers the signal characteristic of the position of said drive shaft before the second detector element and when the ball passes from a closed position to an open position, the first detector element delivers the signal characteristic of the position of said drive shaft before the second detector element.

7. A method of diagnosing the operation of the valve of claim 1, comprising the steps of checking, during operation of the valve, consistency of a control signal, sent to the actuator in order to make the ball pivot, with the signals generated by the torque generation unit and the position detector, and an inconsistency is detected.

8. A device comprising:
   a valve comprising:
   a) an actuator driven by an electric motor;
   b) a drive shaft configured for rotation by the actuator;
   c) a valve body configured for connection to a fuel flow pipe;
   d) a ball in said valve body, said ball having a through-opening and being secured to a first end of the drive shaft and configured for rotation by the motor-driven actuator, wherein the motor-driven actuator is configured to drive a second end of the drive shaft about an axis in said valve body, with the rotation having two ends in a range of rotation, in which one end of the range of rotation is defined as an open position, with the through-opening of the ball being oriented in a direction allowing fuel to flow through the fuel pipe, and the second end of the range of rotation is defined as a closed position, with the through-opening of the ball being oriented in a direction preventing the fuel from flowing through the fuel pipe;

e) a torque generation unit that includes an elastomeric disk having at least one protruding element and stop unit, in which the torque generation unit is positioned at one end of a secondary shaft, which is distinct from the drive shaft, with the secondary shaft being secured to the ball, wherein said torque generation unit is configured to generate a torque, in which the torque is progressively generated as the ends of the range of rotation of the ball in the valve body are reached by simultaneous rotation of the disk and ball, until the at least one protruding element of the disk comes into contact with the stop unit, and the generation of the torque increases a current drawn by the actuator; and f) a position detector positioned at the second end of the drive shaft, opposite the first end of the drive shaft, with the position detector being structured to deliver signals characterizing positions of said drive shaft, wherein the torque is increased wherein the torque is increased by deformation of the at least one protruding element of the elastomeric disk as the ball rotates from the open position to the closed position before the closed position is detected, and as the ball rotates from the closed position to the open position before the open position is detected;

a control unit for controlling the rotation of an electric actuator and for recording the signals generated by the torque generation unit and the position detector of the valve;

a power supply unit for supplying the actuator with electric power;

a current control unit for measuring the intensity of the current and for analyzing the current drawn by the actuator; and a maintenance unit which generate a warning message in the event of the valve failing when an inconsistency between a control signal, sent to the actuator in order to make the ball pivot, and the signals generated by the torque generation unit and the position detector is detected.

* * * * *